United States Patent
Ueno

(10) Patent No.: US 6,278,476 B1
(45) Date of Patent: Aug. 21, 2001

(54) IMAGE FORMING APPARATUS IN WHICH A LASER BEAM IS APPLIED FROM A SEMICONDUCTOR LASER TO SCAN AN IMAGE CARRIER, AND METHOD OF CONTROLLING THE APPARATUS

(75) Inventor: Sueo Ueno, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,951

(22) Filed: Mar. 9, 2000

(51) Int. Cl.$^7$ ................................................. B41J 2/435
(52) U.S. Cl. ............................................. 347/247; 347/237
(58) Field of Search .................................. 347/237, 236, 347/246, 247, 253; 372/29, 33, 34, 38; 250/205, 206, 208.4

(56) References Cited

U.S. PATENT DOCUMENTS 4,819,241 * 4/1989 Nagano ................................. 372/38
5,651,017 * 7/1997 Genovese ............................. 372/38
5,708,673 * 1/1998 Ikeuchi ................................ 372/38

FOREIGN PATENT DOCUMENTS 10-76705   3/1998  (JP) .

* cited by examiner

Primary Examiner—N. Le
Assistant Examiner—Hai C. Pham
(74) Attorney, Agent, or Firm—Foley & Lardner

(57) ABSTRACT

A driving current is supplied via a current limiting resistor to a laser diode for emitting a red laser beam. This driving current is controlled so as to make the optical output of the laser diode have a predetermined reference value. Further, a current of a constant level is intermittently subtracted from the driving current flowing into the laser diode, on the basis of an image to be formed.

13 Claims, 7 Drawing Sheets

IMAGE FORMING APPARATUS IN WHICH A LASER BEAM IS APPLIED FROM A SEMICONDUCTOR LASER TO SCAN AN IMAGE CARRIER, AND METHOD OF CONTROLLING THE APPARATUS

BACKGROUND OF THE INVENTION

In an image forming apparatus such as an electronic copy machine, a facsimile, a printer, etc., an electrostatic latent image is formed on a photosensitive drum by scanning the surface of the drum with a laser beam emitted from a semiconductor laser such as a laser diode, thereby developing the latent image using a developer (toner) and transferring it onto a sheet of paper.

The diameter of a laser beam emitted from the laser diode is determined in accordance with the wavelength of the beam. The shorter the wavelength of the laser beam, the smaller the diameter of the laser beam. A laser beam of a short wavelength and a small diameter is suitable for high-speed, high-density image forming. A red laser beam is an example of a laser beam of a short wavelength and a small diameter.

The laser diode for emitting a red laser beam, however, has a high radiation efficiency. Accordingly, when a driving current in the form of a pulse wave has fallen, the temperature of the diode soon falls, whereas when the driving current has risen, the temperature does not promptly increase. A period of several microseconds to several tens of microseconds is necessary until a sufficient light output is obtained after the driving current rises. This delay in the rise of output light adversely affects image forming.

BRIEF SUMMARY OF THE INVENTION

It is the object of the invention to provide a highly reliable image forming apparatus capable of high-speed, high-density image forming, using a semiconductor laser for emitting a laser beam of a short wavelength, and also capable of always forming a high quality image free from the influence of the characteristics of the laser, and to provide a method for controlling the apparatus.

The invention provides an image forming apparatus for scanning an image carrier by a laser beam emitted from a semiconductor laser, comprising:

a driving circuit having a resistor for limiting a current, the driving circuit supplying the semiconductor laser with a driving current via the resistor;

a control circuit for controlling an output of the driving circuit such that an optical output of the semiconductor laser has a predetermined reference value;

a constant current supply connected parallel to the semiconductor laser for subtracting a current of a constant level from the driving current supplied to the semiconductor laser; and a switch circuit for intermittently operating the constant current supply on the basis of an image to be formed.

Additional objects and advantages of the invention will be set forth in the description which follows, and in part will be obvious from the description, or may be learned by practice of the invention. The object and advantage of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

The embodiment of the invention will be described.

Figure 1:
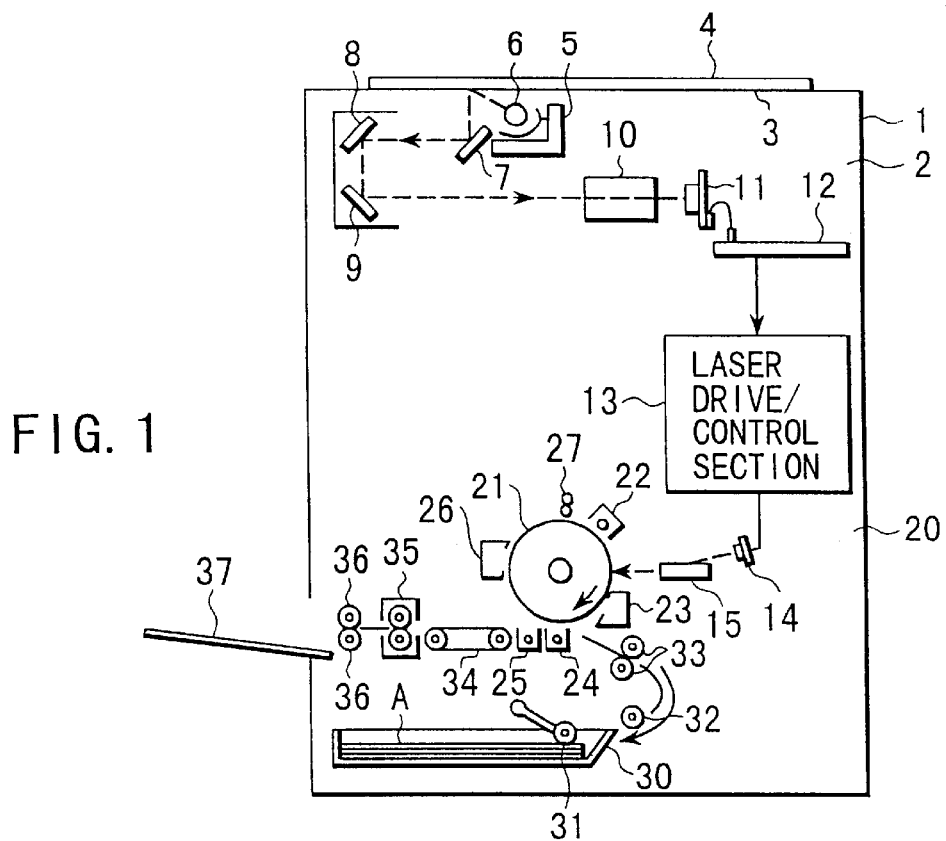
FIG. 1 is a view showing the entire structure of an embodiment.

FIG. 1 shows the main body of an electronic copy machine as an image forming apparatus, which includes a scanner section 2 and a printer section 20.

A document table 3 for mounting therein a document is provided at an upper portion of the scanner section 2, and a document cover 4 is provided on the document table 3 such that it can be opened and closed.

A carriage 5 is provided below the document table 3 such that it can reciprocate. An exposure lamp 6 is provided in the carriage 5. The reciprocating motion of the carriage 5 while lighting the exposure lamp 6 enables optical scanning of the entire surface of the document table 3.

A reflected light image of a document placed on the document table 3 is obtained by optical scanning, and projected onto a CCD sensor 11 via reflecting mirrors 7, 8 and 9 and a variably magnifying lens block 10. The CCD sensor 11 outputs an image signal of a level corresponding to the amount of received light. This image signal is supplied to an image processing circuit 12. The image processing circuit 12 subjects the image signal to a series of image processing such as shading correction and gamma correction, thereby outputting image data corresponding to a to-be-formed image (an image on the document). The image data is supplied to a laser drive/control section 13 incorporated in the printer section 20.

The laser drive/control section 13 drives a semiconductor laser such as a laser diode 14 in accordance with the image data. The laser diode 14 emits a red laser beam of a short wavelength.

The laser beam emitted from the laser diode 14 is reflected by a deflector such as a polygonal mirror 15. While the polygonal mirror 15 rotates, the laser beam reflected therefrom scans the surface of an image carrier, such as a photosensitive drum 21, along the axis of the drum. Scanning executed along the axis of the photosensitive drum 21 is called "main scanning". While rotating the photosensitive drum 21, main scanning is repeatedly executed. The direction in which main scanning is repeatedly executed on the photosensitive drum 21 is called "sub-scanning direction".

A charger 22, a developing unit 23, a transfer unit 24, a separating unit 25, a cleaner 26 and a deelectrifying unit 27 are provided in this order around the photosensitive drum 21. A sheet cassette 30 is provided below the photosensitive drum 21.

The sheet cassette 30 contains a great number of copy paper sheets A. The copy sheets A are picked up by a pickup roller 31 one by one, separated from the sheet cassette 30 by a separating unit 32 and guided to resist rollers 33. The resist rollers 33 cooperate to send each paper sheet A between the photosensitive drum 21 and the transfer unit 24.

The charger 22 charges the surface of the photosensitive drum 21 with static electricity. This charging process and irradiation of the photosensitive drum 21 with a laser beam enables formation of an electrostatic latent image on the photosensitive drum 21.

The developing unit 23 supplies a developer to the photosensitive drum 21. As a result of the supply of the developer, an electrostatic latent image is developed on the photosensitive drum 21. The transfer unit 24 transfers the developed image (the developer image) onto each paper sheet A sent by the resist rollers. The image-transferred sheet A is separated from the photosensitive drum 21 by the separating unit 25. The separated sheet A is sent to a fixing unit 35 by a conveyance belt 34.

The fixing unit 35 heats the paper sheet A to fix the developer image on the sheet A. The paper sheet A from the fixing unit 35 is discharged into a tray 37 through conveyance rollers 36.

Figure 2:
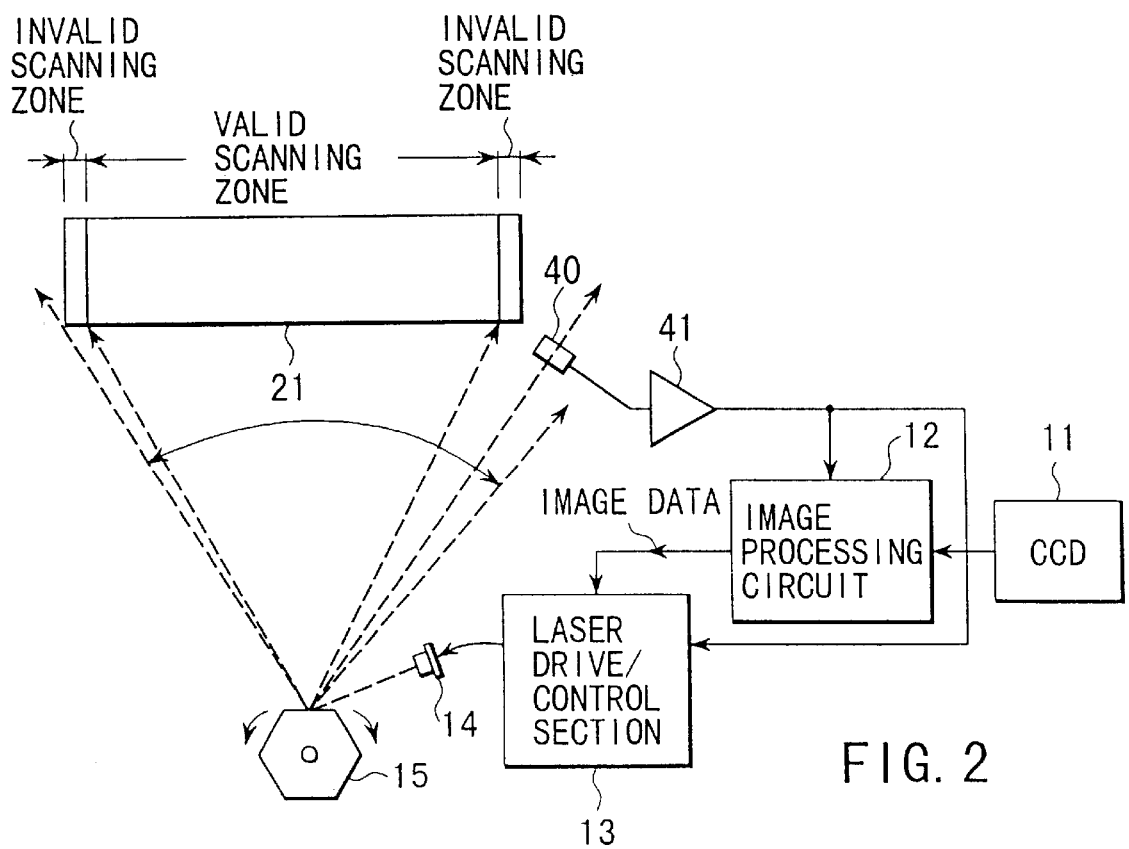
FIG. 2 is a view showing the structure of an essential part of the embodiment.
Figure 3:
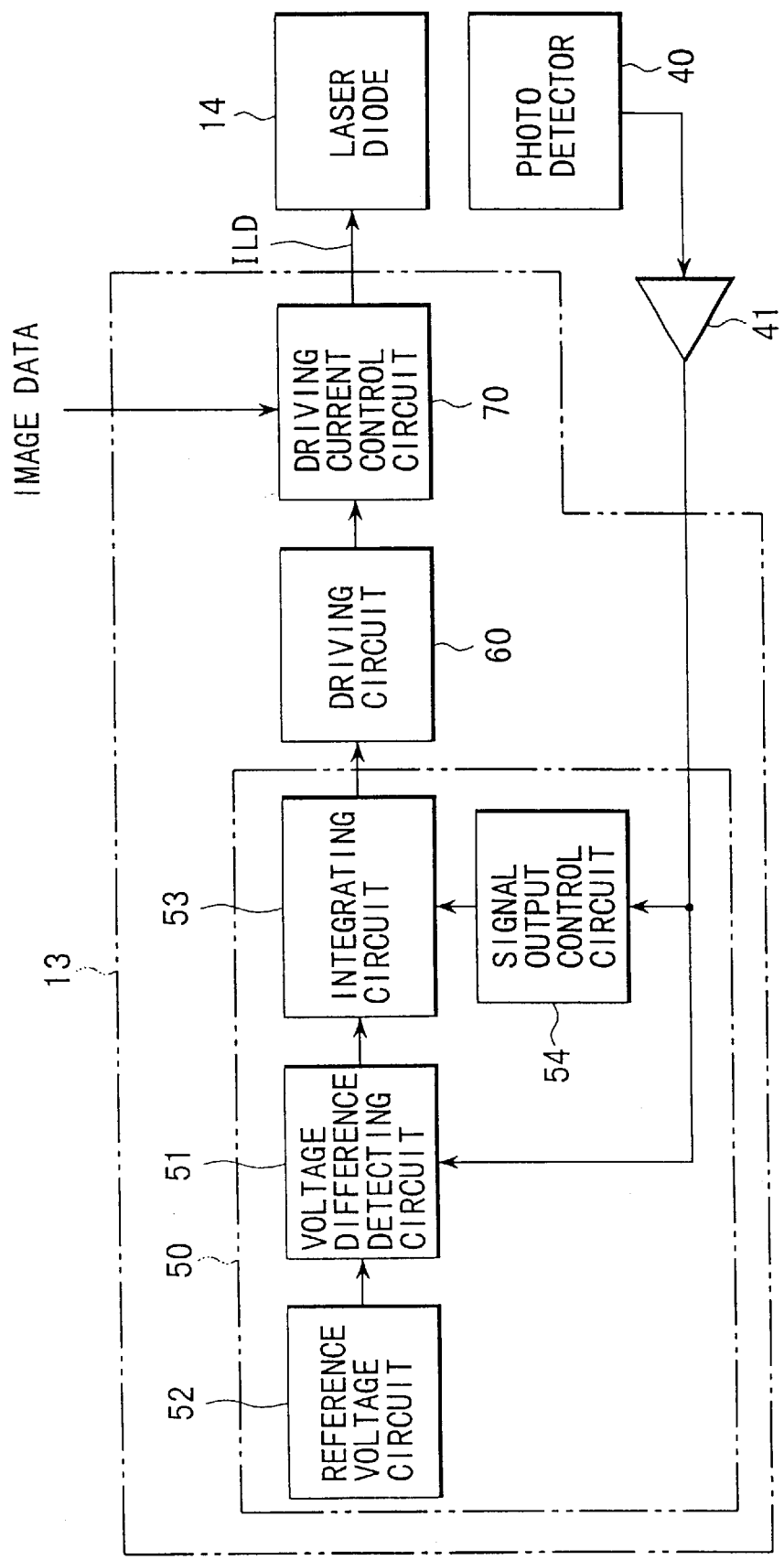
FIG. 3 is a block diagram illustrating in detail a laser driving circuit appearing in FIG. 2.

As is shown in FIG. 2, the scanning range of the laser beam includes the entire axial zone of the photosensitive drum 21 from one end to the other end thereof, and also a predetermined zone that extends from the other end of the photosensitive drum 21 to the outside thereof. The entire axial zone of the photosensitive drum 21 from one end to the other end thereof includes the valid scanning zone (corresponding to the image forming zone) of the photosensitive drum 21, and invalid scanning zones that exist at the opposite sides of the valid scanning zone. Further, a photodetector 40 is provided in the predetermined zone.

The photodetector 40 is used to detect the end of one scanning sweep and the optical output of a laser beam. When it has received a laser beam, it outputs a current of a level corresponding to the received light amount. The output current is converted into a voltage signal by an amplifier 41, and supplied to the image processing circuit 12 and the laser drive/control section 13.

The laser drive/control section 13 has an automatic laser power control (ALPC) circuit 50, a driving circuit 60 and a driving current control circuit 70.

The automatic laser power control circuit 50 controls the output of the driving circuit 60 during a period corresponding to the valid scanning zone of a laser beam on the photosensitive drum 21 so as to make the optical output detected by the photodetector 40 identical to a predetermined reference value. The circuit 50 includes a voltage difference detecting circuit 51, a reference voltage circuit 52, an integrating circuit 53 and a signal output control circuit 54.

The voltage difference detecting circuit 51 detects the difference between the output voltage of the amplifier 41 based on the amount of light received by the photodetector 40, and a reference voltage (corresponding to the reference value) output from the reference voltage circuit 52. The integrating circuit 53 integrates the voltage difference detected by the voltage difference detecting circuit 51, holds the integration result for a period for which it continues to receive a hold instruction from the signal output control circuit 54, and outputs a control voltage of a level corresponding to the held integration result. The output of the driving circuit 60 is controlled in accordance with the control voltage. The signal output control circuit 54 detects a period corresponding to the valid scanning zone of a laser beam on the photosensitive drum 21, on the basis of the output of the amplifier 41, and supplies the integrating circuit 53 with the hold instruction for the detected period.

Figure 4:
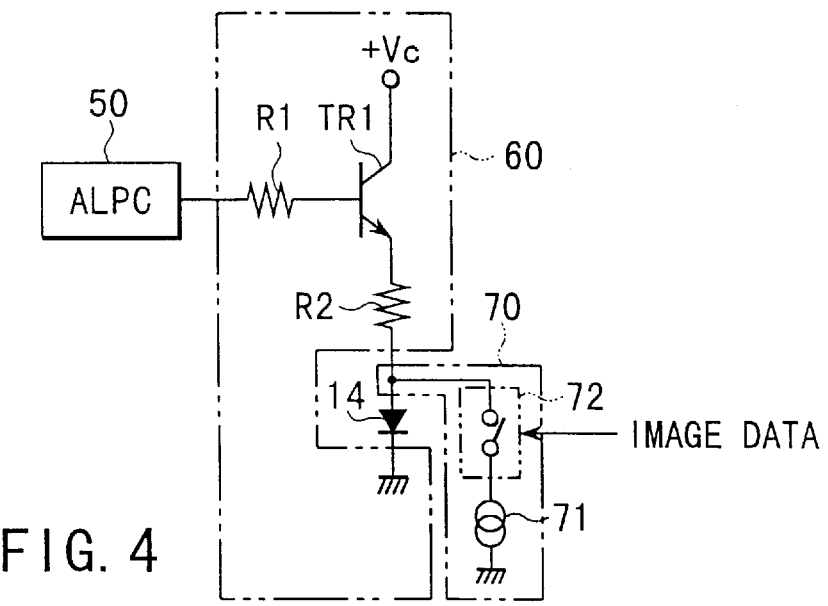
FIG. 4 is a view illustrating in detail a driving circuit and a driving current control circuit appearing in FIG. 3.

The driving circuit 60 outputs a driving current ILD for driving the laser diode 14, as shown in FIG. 4. The driving current control circuit 70 controls the driving current ILD, output from the driving circuit 60, on the basis of image data supplied from the image processing circuit 12.

FIG. 4 specifically shows the structures of the driving circuit 60 and the driving current control circuit 70.

The driving circuit 60 has an input resistor R1 and an NPN transistor TR1. The circuit 60 is an emitter follower circuit of a structure in which a driving DC voltage Vc is applied, via the collector/emitter of the transistor TR1, to a series circuit consisting of a current-limiting resistor R2 and the laser diode 14, and in which the control voltage output from the automatic laser power control circuit 50 is applied, via the input resistor R1 and the base/emitter of the transistor TR1, to a series circuit consisting of the current-limiting resistor R2 and the laser diode 14. The driving current ILD flows into the laser diode 14 via the resistor R2.

The driving current control circuit 70 is connected parallel to the laser diode 14. The circuit 70 includes a constant current supply 71 for subtracting a current $I_{co}$ of a certain level from the driving current ILD to be flown into the laser diode 14, and a switch circuit 72 for intermittently driving the constant current supply 71 in accordance with the image data supplied from the image processing circuit 12.

Figure 5:
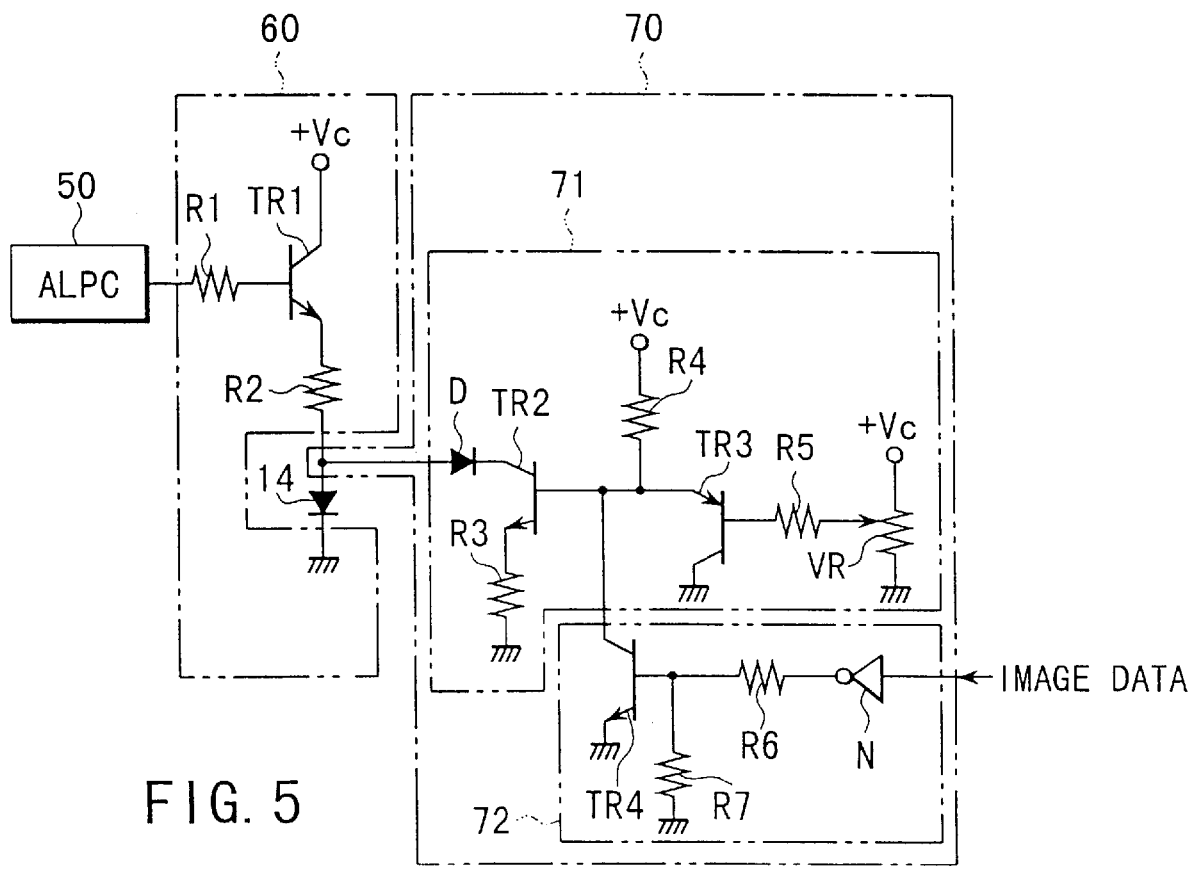
FIG. 5 is a view illustrating in more detail the structure of FIG. 4.

FIG. 5 specifically shows the structures of the constant current supply 71. As shown, an NPN transistor TR2 has its collector connected to a junction between the resistor R2 and the laser diode 14 via a forward diode D, and its emitter grounded via a resistor R3. The base of the transistor TR2 is connected to the positive terminal of the DC voltage Vc via a resistor R4, and also connected to the emitter of a PNP transistor TR3. The DC voltage Vc is applied to a variable resistor VR, and a voltage at the slidable terminal of the variable resistor VR is applied between the base and the emitter of the transistor TR3 via a resistor R5. The transistors TR2 and TR3 are connected by complementary connection. This complementary connection imparts, to the constant current supply 71, a temperature compensating function for compensating a change in output due to a change in temperature.

FIG. 5 also specifically shows the structure of the switch circuit 72. As shown, the base of the transistor TR2 is grounded via the collector and the emitter of an NPN transistor TR4. Image data supplied from the image processing circuit 12 is applied to a resistor R7 via a resistor R6, and a voltage generated at the resistor R7 is applied between the base and the emitter of the transistor TR4. When the image data has logic "1", the transistor TR4 is turned on. When the transistor TR4 has been turned on, the transistor TR2 of the constant current supply 71 is turned off, and hence the constant current supply 71 is turned off. When the image data has shifted to logic "0", the transistor TR4 is turned off. When the transistor TR4 has been turned off, the transistor TR2 of the constant current supply 71 is turned on, and hence the constant current supply 71 is turned on.

The operation will now be described.

The logic level of the image data differs depending upon whether each dot included in a to-be-formed image has a black level or a white level.

Figure 6:
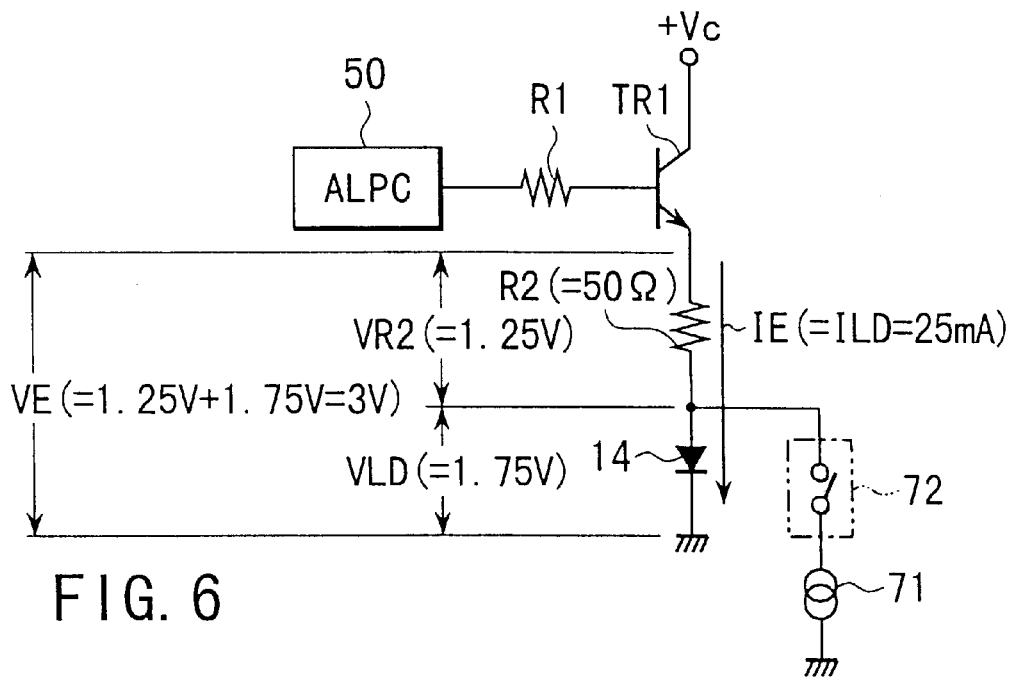
FIG. 6 is a view illustrating voltage values and a current value at various sections, obtained when a switching circuit shown in FIG. 4 is in the OFF state.

If the image data has logic "1", the transistor TR2 of the constant current supply 71 is turned off. At this time, as shown in FIG. 6, all the emitter current IE of the transistor TR1 flows into a laser diode LD, and serves as the driving current ILD. The automatic laser power control circuit 50 controls the emitter voltage VE of the transistor TR1 to 3 V. By This control, the optical output P of the laser diode 14 is kept at 1 mW.

Figure 8:
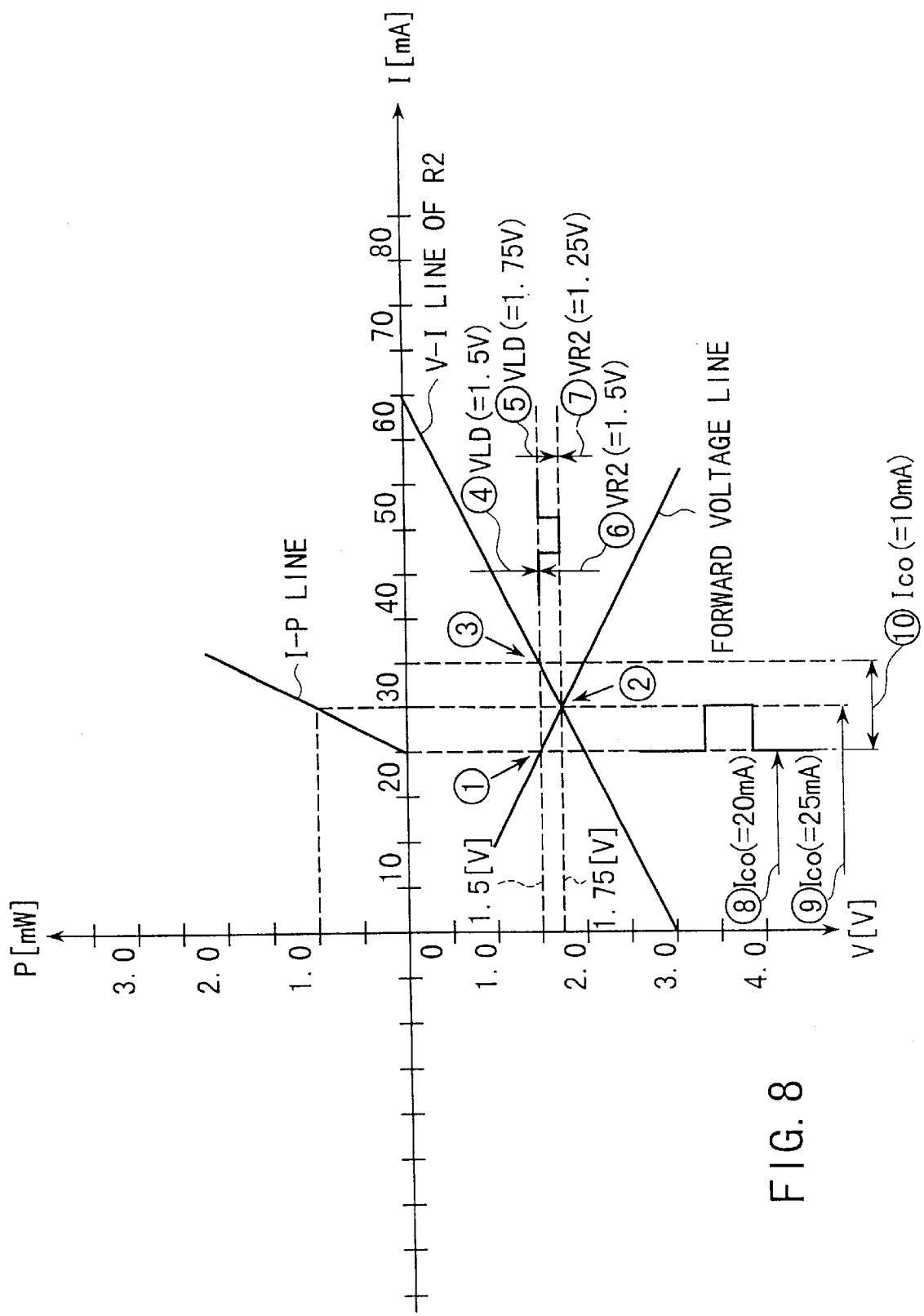
FIG. 8 is a view showing the relationship between the voltage and the current in each section in FIG. 4.

As is understood from FIG. 8, a voltage drop VLD at the laser diode 14 converges 1.75 V (indicated by ② in FIG. 8) so that the sum of the voltage drop VLD at the diode 14 and a voltage drop VR2 at the resistor R2 will be equal to the emitter voltage VE of 3 V. At this time, the emitter current IE is 25 mA, and the optical output P of the laser diode 14 is 1 mW.

Figure 7:
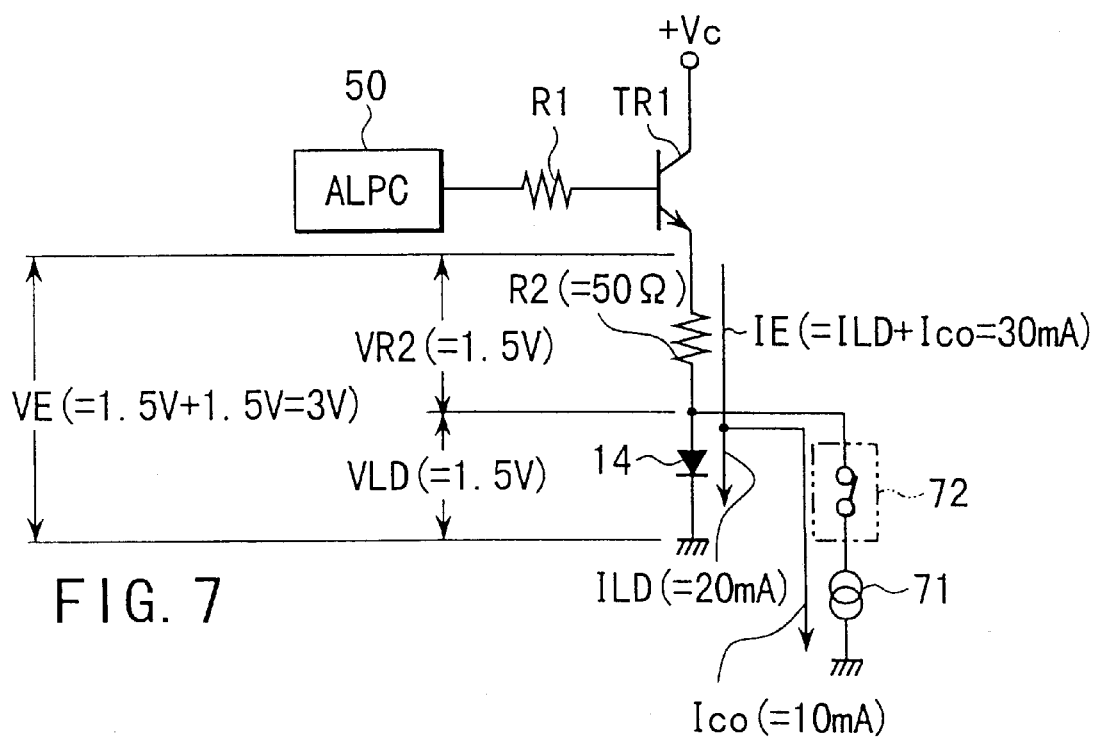
FIG. 7 is a view illustrating voltage values and current values at various sections, obtained when a switching circuit shown in FIG. 4 is in the ON state.

If the image data shifts to logic "0", the transistor TR2 of the constant current supply 71 is turned on. At this time, the current $I_{co}$ of a constant level output from the constant current supply 71, for example, 10 mA, is subtracted from the driving current ILD flowing into the laser diode 14. Then, the emitter current IE of the transistor TR1 flows into the laser diode 14 and the constant current supply 71, as is shown in FIG. 7. Also in this case, the automatic laser power control circuit 50 controls the emitter voltage IE of the transistor TR1 to 3 V. As a result of this control, the optical output of the laser diode 14 is kept at 1 mW.

At this time, as is understood from FIG. 8, the voltage drop VLD at the laser diode 14 and the voltage drop VR2 at the resistor R2 converge a predetermined voltage so that the sum of the voltage drops will be equal to the emitter voltage VE of 3 V. Since in this case, an emitter current IE of 10 mA is added to an initial emitter current IE of 25 mA, the voltage drop VR2 at the resistor R2 increases (as indicated by ③ in FIG. 8). In accordance with an increase in the voltage drop VR2, the voltage drop VLD at the laser diode 14 reduces, and the driving current ILD flowing into the laser diode 14 reduces.

The voltage drop VLD at the laser diode 14 converges 1.5 V (as indicated by ① in FIG. 8), and the driving current ILD flowing into the laser diode 14 becomes 20 mA which is equal to the threshold value. The level of the driving current ILD required for the laser diode 14 to emit a laser beam is higher than the threshold value (=20 mA). Accordingly, when the driving current ILD is as low as the threshold value, the laser diode 14 cannot emit a laser beam.

Figure 9:
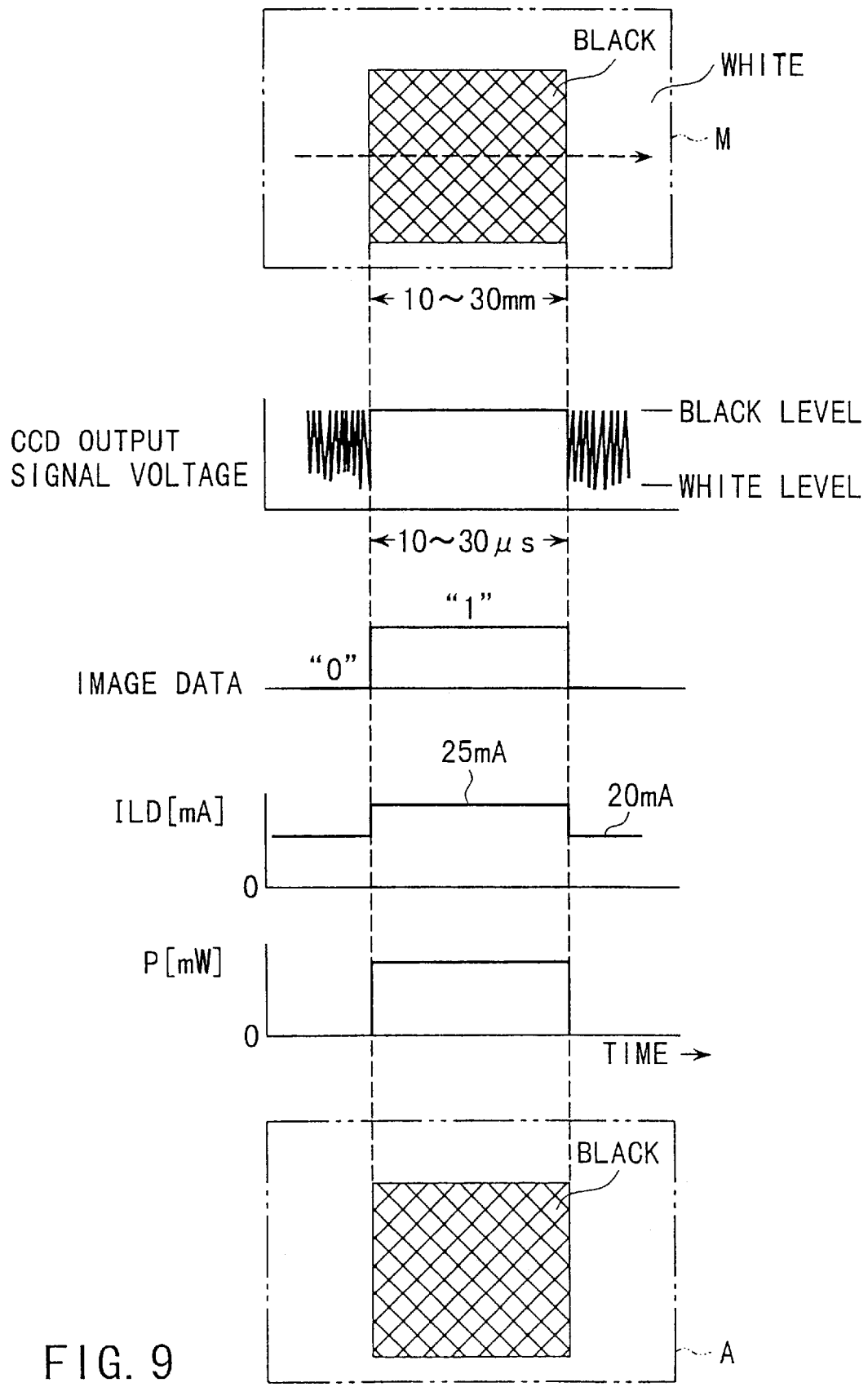
FIG. 9 is a view useful in explaining the operation and the advantage of the embodiment.

FIG. 9 shows examples of the output of the CCD sensor 11, image data, the driving current ILD and the optical output P, which are obtained until an image is formed on a paper sheet A after an image of a document is read.

For example, suppose that a copy machine having a resolution of 600 dpi, a copy speed of 20–30 sheets/min. has optically scanned a document M on which a black image of a uniform density, which has a width of 10–30 mm, is formed in a white background. In this case, the black image has a uniform density, and hence the output signal voltage of the CCD sensor 11 clearly reflects a white level portion and a black level portion of the document. The image processing circuit 12 outputs image data of logic "0" indicating the white level component of the output signal voltage of the CCD sensor 11, and image data of logic "1" indicating the black level component of the same.

When image data of logic "0" has been output, the driving current ILD has the threshold value (=20 mA), and the laser diode 14 does not emit a laser beam. When image data of logic "1" has been output, the driving current ILD increases to 25 mA, and the laser diode 14 emits a laser beam.

While the laser diode 14 is turned on and off, an image is formed on a paper sheet A by means of the photosensitive drum 21.

Although the laser diode 14 that emits a red laser beam has a high radiation efficiency, a temperature reduction can be avoided when the laser diode 14 is in the OFF state, since the driving current ILD of the threshold value flows through the diode as a bias current. Accordingly, when the laser diode 14 is driven in accordance with the rising edge of the driving current ILD, it emits a laser beam of a sufficient optical output no later than the rising edge of the driving current ILD.

Figure 10:
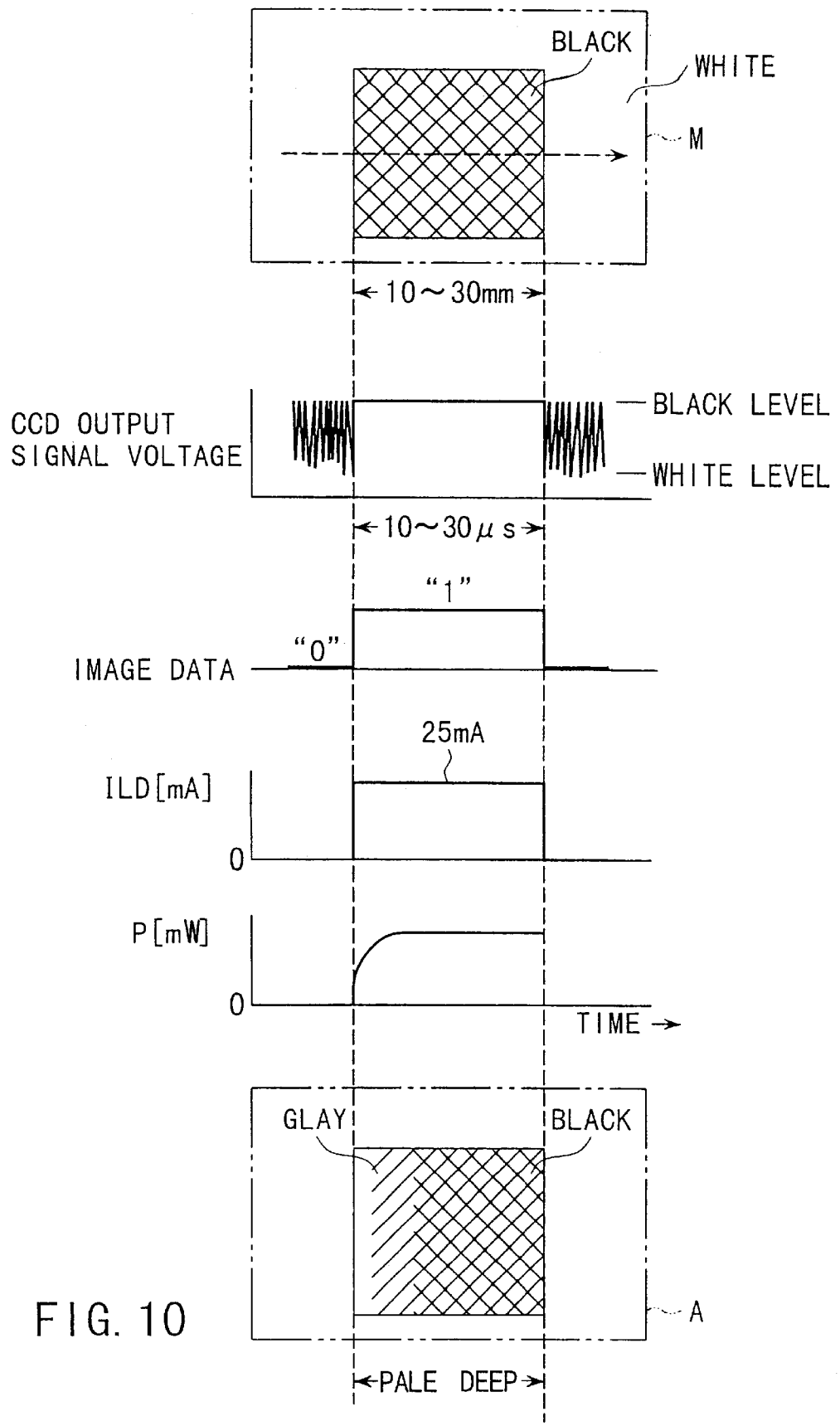
FIG. 10 is a view useful in explaining the operation executed when the embodiment does not employ the driving current control circuit.

If there is no driving current control circuit 70, the driving current ILD reduces to zero when the laser diode 14 is in the OFF state. Therefore, in this case, a period of several microseconds to several tens of microseconds is necessary until the laser diode 14 emits a sufficient optical output after the driving current rises and the laser diode 14 is turned on, as is shown in FIG. 10. This causes ununiformity of density in an image formed on the paper sheet A.

When, as described above, the laser diode 14 is in the OFF state, a delay in the rising of the optical output P of the laser diode 14, which occurs when the driving current ILD rises, can be eliminated by making a driving current ILD of a threshold value flow through the diode 14 as a bias current. This always enables the formation of a high quality image.

As a matter of course, the use of the laser diode 14 that emits a red laser beam of a short wavelength enables high-speed and high-density image formation.

Further, since the bias current is obtained by subtracting a current of a constant level from the driving current ILD flowing into the laser diode 14, it is not necessary to make the structure of the automatic laser power control circuit 50 complicated so as to secure the bias current.

Although the embodiment employs a laser diode that emits a red laser beam, it can also employ a laser diode that emits a laser beam of any other color.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for scanning an image carrier by a laser beam emitted from a semiconductor laser, comprising:

a driving circuit having a resistor for limiting a current, the driving circuit supplying the semiconductor laser with a driving current via the resistor;

a control circuit for controlling an output of the driving circuit such that an optical output of the semiconductor laser has a predetermined reference value;

a constant current supply connected parallel to the semiconductor laser for subtracting a current of a constant level from the driving current to flow into the semiconductor laser; and a switch circuit for intermittently operating the constant current supply on the basis of an image to be formed.

2. An image forming apparatus according to claim 1, wherein the driving circuit is an emitter follower circuit having an input resistor and an NPN transistor, an operating DC voltage being applied to a series circuit of the resistor and the semiconductor laser through the collector/emitter of the transistor, a control voltage output from the control circuit being applied to the series circuit of the resistor and the semiconductor laser through the input resistor and the base/emitter of the transistor.

3. An image forming apparatus according to claim 1, wherein the constant current supply has a temperature compensating function for compensating a change in output due to a change in temperature.

4. An image forming apparatus according to claim 1, wherein said constant current supply subtracts said current from the driving current when the semiconductor laser is not transmitting such that a remaining current below a transmitting threshold limit of the semiconductor laser continues to flow through the semiconductor laser to maintain the semiconductor laser in an increased-temperature, off state.

5. An image forming apparatus for scanning an image carrier by a laser beam emitted from a semiconductor laser, comprising:

a driving circuit having a resistor for limiting a current, the driving circuit supplying the semiconductor laser with a driving current via the resistor;

detecting means for detecting an optical output of the semiconductor laser while scanning is executed in a period which does not correspond to an invalid scanning zone defined on the image carrier;

a control circuit for controlling an output of the driving circuit while scanning is executed in a period which corresponds to the invalid scanning zone, so that a difference between the optical output detected by the detecting means and a predetermined reference value will be zero;

a constant current supply connected parallel to the semiconductor laser for subtracting a current of a constant level from the driving current to flow into the semiconductor laser; and a switch circuit for intermittently operating the constant current supply on the basis of an image to be formed.

6. An image forming apparatus according to claim 5, wherein the detecting means is a photodetector for receiving a laser beam emitted from the semiconductor laser and outputting a signal corresponding to a light amount of the received laser beam.

7. An image forming apparatus according to claim 5, wherein the driving circuit is an emitter follower circuit having an input resistor and an NPN transistor, an operating DC voltage being applied to a series circuit of the resistor and the semiconductor laser through the collector/emitter of the transistor, a control voltage output from the control circuit being applied to the series circuit of the resistor and the semiconductor laser through the input resistor and the base/emitter of the transistor.

8. An image forming apparatus according to claim 5, wherein the constant current supply has a temperature compensating function for compensating a change in output due to a change in temperature.

9. An image forming apparatus according to claim 5, wherein said constant current supply subtracts said current from the driving current when the semiconductor laser is not transmitting such that a remaining current below a transmitting threshold limit of the semiconductor laser continues to flow through the semiconductor laser to maintain the semiconductor laser in an increased-temperature, off state.

10. A control method of controlling an image forming apparatus for scanning an image carrier by a laser beam emitted from a semiconductor laser, comprising the steps of:

supplying a driving current to the semiconductor laser via a current limiting resistor;

controlling the driving current such that an optical output of the semiconductor laser has a predetermined reference value; and intermittently subtracting a current of a constant level from the driving current to flow into the semiconductor laser, on the basis of an image to be formed.

11. A method according to claim 10, wherein said subtracting said current from the driving current occurs when the semiconductor laser is not transmitting such that a remaining current below a transmitting threshold limit of the semiconductor laser continues to flow through the semiconductor laser to maintain the semiconductor laser in an increased-temperature, off state.

12. A control method of controlling an image forming apparatus for scanning an image carrier by a laser beam emitted from a semiconductor laser, comprising the steps of:

supplying a driving current to the semiconductor laser via a current limiting resistor;

detecting an optical output of the semiconductor laser while scanning is executed in a period which does not correspond to an invalid scanning zone defined on the image carrier;

controlling an output of the driving circuit while scanning is executed in a period which corresponds to the invalid scanning zone, so that a difference between the optical output detected by the detecting means and a predetermined reference value will be zero; and intermittently subtracting a current of a constant level from the driving current to flow into the semiconductor laser, on the basis of an image to be formed.

13. A method according to claim 12, wherein said subtracting said current from the driving current occurs when the semiconductor laser is not transmitting such that a remaining current below a transmitting threshold limit of the semiconductor laser continues to flow through the semiconductor laser to maintain the semiconductor laser in an increased-temperature, off state.

* * * * *